(12) United States Patent
Yamazaki

(10) Patent No.: US 7,162,120 B2
(45) Date of Patent: Jan. 9, 2007

(54) TUNABLE DISPERSION COMPENSATOR AND METHOD FOR TUNABLE DISPERSION COMPENSATION

(75) Inventor: Hiroyuki Yamazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 176 days.

(21) Appl. No.: 10/891,023

(22) Filed: Jul. 15, 2004

(65) Prior Publication Data

US 2005/0013538 A1    Jan. 20, 2005

(30) Foreign Application Priority Data

Jul. 18, 2003    (JP) ............................. 2003-276960

(51) Int. Cl.
G02B 6/26    (2006.01)
(52) U.S. Cl. ...................................... 385/27
(58) Field of Classification Search ............... 385/27
See application file for complete search history.

(56) References Cited

U.S. PATENT DOCUMENTS

| | | | |
|---|---|---|---|
| 4,768,850 A * | 9/1988 | Moslehi et al. ................ 385/24 |
| 4,934,777 A * | 6/1990 | Jou et al. ........................ 385/27 |
| 5,422,478 A * | 6/1995 | Wlodarczyk et al. ..... 250/227.21 |
| 5,838,851 A * | 11/1998 | Wisseman et al. ............. 385/32 |
| 6,229,939 B1 * | 5/2001 | Komine ........................ 385/29 |
| 6,289,151 B1 * | 9/2001 | Kazarinov et al. ............. 385/32 |
| 6,535,672 B1 * | 3/2003 | Paiam ........................... 385/50 |
| 6,766,083 B1 * | 7/2004 | Bona et al. .................... 385/40 |
| 2003/0202743 A1 * | 10/2003 | Shibata ......................... 385/27 |

FOREIGN PATENT DOCUMENTS

| JP | H06-224860 A | 8/1994 |
|---|---|---|
| JP | 2000-151513 A | 5/2000 |

* cited by examiner

*Primary Examiner*—Ellen E. Kim
(74) *Attorney, Agent, or Firm*—Sughrue Mion, PLLC

(57) ABSTRACT

A tunable dispersion compensator and a tunable dispersion compensation method having an excellent dispersion compensation characteristic are provided. A tunable dispersion compensator 201 is constructed of first to fourth ring resonators $202_1$ to $202_4$ connected in series along a common linear waveguide 203. The linear waveguide 203 is provided with first to fifth mode filters $204_1$ to $204_5$ in such a way as to sandwich the ring resonators $202_1$ to $202_4$ respectively. These mode filters $204_1$ to $204_5$ eliminate high-order mode noise components which transmit through the linear waveguide 203. The mode filters $204_1$ to $204_5$ are constructed with the width of a central waveguide reduced or in a curved shape.

14 Claims, 6 Drawing Sheets

TUNABLE DISPERSION COMPENSATOR AND METHOD FOR TUNABLE DISPERSION COMPENSATION

BACKGROUND OF THE INVENTION

1. Field of the Invention

The present invention relates to a tunable dispersion compensator and a method for tunable dispersion compensation for compensating dispersion of an optical signal.

2. Description of the Related Art

With the growing demand for information communication, there is a demand for greater transmission capacities. To meet this demand, efforts are being made to increase a transmission rate in an optical communication system. As the transmission rate is increased, a light waveform deteriorates due to chromatic dispersion in an optical fiber. The chromatic dispersion refers to a phenomenon that the rate at which an optical signal propagates through the optical fiber varies depending on the wavelength. Thus, a dispersion compensating fiber (DCF) is widely used to suppress the deterioration of the light waveform due to chromatic dispersion.

The DCF is designed to have a core diameter smaller than that of an ordinary optical fiber. This makes chromatic dispersion negative. This causes the chromatic dispersion of the DCF to have a characteristic having directionality opposite to that of the ordinary optical fiber. Therefore, combining the ordinary optical fiber with this DCF makes it possible to cancel chromatic dispersion produced by the ordinary optical fiber with the DCF and to suppress the deterioration of the light waveform.

However, the DCF does not have so great an amount of negative dispersion per length. Thus, the length of the DCF required to obtain an amount of dispersion compensation capable of long-distance communication is several tens of km. This causes a problem that the size of the equipment carrying out compensation of chromatic dispersion increases. Furthermore, since the DCF has quite a large transmission loss of an optical signal, an expensive light amplifier is required to compensate for the transmission loss. Furthermore, since the DCF has a small core diameter, the optical signal is trapped in a narrow area. This causes nonlinear interaction, deteriorating the light waveform. There is another problem that the amount of dispersion compensation cannot be made variable. Thus, the use of the DCF involves many problems. Therefore, there is a demand for realization of a tunable dispersion compensator, which solves these problems.

A first proposal for this is a tunable dispersion compensator using a ring resonator formed of a PLC (planar lightwave circuit) (see Japanese Patent Application Laid-Open No. 6-224860, for example). Here, the PLC refers to a silica glass optical waveguide formed by depositing silica glass, etc., on a silicon or silica substrate. The PLC also includes an optical component or optical circuit with an optical fiber array connected to the silica glass optical waveguide. This first proposal is constructed of a one-stage ring resonator placed between optical fibers or between an optical fiber and optical multiplexed receiving apparatus, wherein an optical multiplexed signal is output with a time delay. This first proposal is an attempt to compensate for all wavelengths to be used at once for chromatic dispersion which the optical multiplexed signal receives inside the optical fiber.

FIG. 1 shows an example of a ring resonator as a conventionally proposed tunable dispersion compensation device. This ring resonator 101 is constructed of a waveguide 102 which inputs and outputs an optical signal, an optical coupler 103 which distributes the optical signal and a ring-shaped waveguide 104 which delays the distributed optical signal. The ring-shaped waveguide 104 is provided with a heater 105 for heating control. The optical coupler 103 is made up of, for example, a directional coupler.

The operation of the ring resonator 101 shown in FIG. 1 will be explained. When an optical signal 106 is input from an optical fiber, etc., to the waveguide 102, the optical signal 106 is distributed to the ring-shaped waveguide 104 by the optical coupler 103 at a predetermined rate. The distributed optical signal is delayed by the ring-shaped waveguide 104. This delayed optical signal is returned by the optical coupler 103 to the waveguide 102 and output as an optical signal 107.

Here, when a current is passed to the heater 105 in the ring resonator 101, the temperature of the ring-shaped waveguide 104 is controlled by the heater 105. This changes the resonating central wavelength $\lambda$ of the ring-shaped waveguide 104. That is, the ring resonator 101 changes this central wavelength through energization control by the heater 105.

FIG. 2 shows a variation caused by a temperature characteristic of a resonating central wavelength of the ring resonator in FIG. 1. The horizontal axis represents wavelength $\lambda$ and the vertical axis represents delay time $\tau$. The solid lines show that the heater 105 shown in FIG. 1 is controlled to a predetermined temperature. The central wavelength of the delay time spectrum at this time is $\lambda_A$. When the temperature of the heater 105 is increased in this condition, the central wavelength $\lambda_A$ moves toward the long wavelength side as shown by an arrow 121. On the other hand, when the temperature is reduced, the central wavelength $\lambda_A$ moves toward the short wavelength side as shown by an arrow 122.

Here, ring resonators may be connected in multi-stages (see Japanese Patent Application Laid-Open No. 2000-151513, for example). When the ring resonators are connected in multi-stages in this way, the optical signal 107 output from the 1st stage ring resonator 101 shown in FIG. 1 is input to a ring resonator in the next stage (not shown) connected to the waveguide 102. FIG. 3 shows a tunable dispersion compensator made up of such ring resonators connected in multi-stages. This tunable dispersion compensator 141 connects first to fourth ring resonators $101_1$ to $101_4$ in series along one common waveguide 102. In this FIG. 3, the same components as those in FIG. 1 are assigned the same reference numerals and explanations thereof are omitted as appropriate. Here, reference numerals denoting the components of the first to fourth ring resonators $101_1$ to $101_4$ are accompanied by subscripts "1" to "4" indicating the ring resonators $101_1$ to $101_4$ respectively.

In the tunable dispersion compensator 141 shown in FIG. 3, the heaters $105_1$ to $105_4$ of the first to fourth ring resonators $101_1$ to $101_4$ are controlled individually. In this way, the tunable dispersion compensator 141 can obtain an arbitrary dispersion slope. That is, as explained with FIG. 1 and FIG. 2, when only one ring resonator 101 is used, the delay time spectrum becomes a quasi-Gaussian distribution as shown in FIG. 2. However, shifting the respective resonating central wavelengths of the first to fourth ring resonators $101_1$ to $101_4$ and adding them together can form a linear slope.

FIG. 4 shows an example where a linear slope is formed. In this example, the heaters $105_1$ to $105_3$ of the first to third ring resonators $101_1$ to $101_3$ shown in FIG. 3 are controlled to a predetermined temperature and the resonating central wavelengths are set to $\lambda_1$, $\lambda_2$ and $\lambda_3$. At this time, the central wavelength of the combined waveform the first to third ring resonators $101_1$ to $101_3$ is $\lambda_A$. When the heater $105_4$ is set to a predetermined temperature, the central wavelength of the fourth ring resonator $101_4$ is $\lambda_B$ (=$\lambda_A$) Here, the central wavelength $\lambda_A$ and central wavelength λB are overlapped with each other. Thus, a dispersion slope 145 as indicated by a solid line in FIG. 4 is obtained.

Here, this dispersion slope 145 is contrasted with the inclination at the right of the signal waveform (delay time spectrum) resonated by a single ring resonator shown in FIG. 2. As a result, the dispersion slope 145 has a gentler slope. Furthermore, compared to the inclination at the right of the central wavelength of one ring resonator shown in FIG. 2, a quasi-straight line is obtained. Therefore, dispersion compensation can be performed using this dispersion slope 145.

However, with the tunable dispersion compensator 141 made up of the ring resonators 101 connected in multi-stages, high-order modes are derived from the fundamental mode when light transmits through the waveguide 102. Because of this influence, the S/N ratio (signal to noise ratio) of a main signal deteriorates, making it difficult to accurately determine central wavelengths of the respective ring resonators. As a result, it is difficult to correct chromatic dispersion of the optical fiber optimally.

SUMMARY OF THE INVENTION

It is an object of the present invention to provide a tunable dispersion compensator and a tunable dispersion compensation method having an excellent dispersion compensation characteristic.

The tunable dispersion compensator according to the present invention comprises a mode filter which inputs an optical signal, removes high-order modes of the optical signal and outputs only the fundamental mode, a resonator which inputs the optical signal output from the mode filter and outputs the optical signal with a delay time added and tunable controlling means for controlling the resonator in a tunable manner. Thus, in the tunable dispersion compensator according to the present invention, an optical signal input to the resonator is deprived of high-order mode noise components by the mode filter and has only the fundamental mode. Therefore, the signal waveform obtained through the resonator is free of influences of the high-order mode noise components and acquires a good waveform with less distortion. Therefore, the signal waveform formed by combining these signal waveforms also has a characteristic with less distortion. As a result, an excellent dispersion compensation characteristic is obtained.

Furthermore, a plurality of resonators may also be provided in series and mode filters may be provided at least one of the input side and output side of each the resonator. In this way, a high-order mode optical signal input to each resonator is removed by each mode filter and an excellent dispersion compensation characteristic is obtained.

Furthermore, the mode filter and resonator are constructed of optical waveguides on substrates and the tunable controlling means may be disposed in the vicinity of the optical waveguides. This makes it possible to form the mode filter and resonator as one chip.

Furthermore, the mode filter is constructed of a linear waveguide and the linear waveguide may also include narrow portions or bent portions where high-order modes are emitted and only the fundamental mode is transmitted. This makes it possible to form the mode filter in a simple structure.

Furthermore, the resonator may also be a ring resonator. And the ring resonator may comprise a linear waveguide, a ring-shaped waveguide arranged along the linear waveguide and an optical coupler which optically couples the linear waveguide and the ring-shaped waveguide. Then, at least one linear waveguide on the input side or output side of the ring resonator may be provided with a mode filter. This allows the resonator to be formed in a simple structure.

Furthermore, the mode filter includes a bent portion where high-order modes are emitted and only the fundamental mode is transmitted and the bent portion may also be disposed along the perimeter of the ring-shaped waveguide. This allows the bent portion which serves as the mode filter to be disposed with a reduced space with respect to the ring-shaped waveguide. Thus, it is possible to reduce the size of the tunable dispersion compensator.

Furthermore, the ring resonators are arranged adjacent to one another in a matrix form, the linear waveguide is disposed in such as way as to weave along the perimeters of the ring-shaped waveguides of the ring resonators and the bent portions may also be disposed along the perimeters of the ring-shaped waveguides. Or the linear-waveguide may meander, the ring resonators may be disposed in the curved portions where the linear waveguides meander and the bent portions may be arranged along the perimeters of the ring-shaped waveguides of the ring resonators. This allows the bent portion which serves as the mode filter to be disposed with a reduced space with respect to the ring resonator. It is further possible to arrange the respective ring resonators and respective mode filters efficiently. Thus, it is possible to further reduce the size of the tunable dispersion compensator.

The mode filters may also be disposed before and after the resonator. Thus, even if an optical signal is input from both directions, the optical signal is input to the resonator through the mode filter. It is therefore adequately used as polarization diversity in particular.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

The basic structure and operating principle of a tunable dispersion compensator and a tunable dispersion compensation method according to the present invention will be explained below.

Figure 5A:
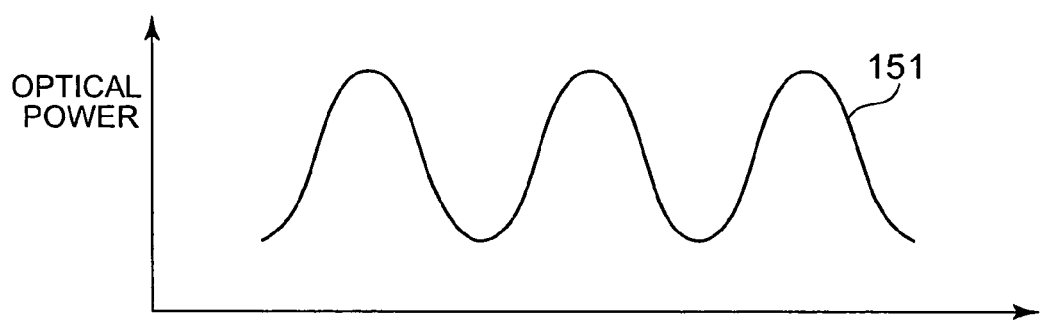
FIG. 5A is a signal waveform diagram with only a fundamental mode optical signal resonating.
Figure 5B:
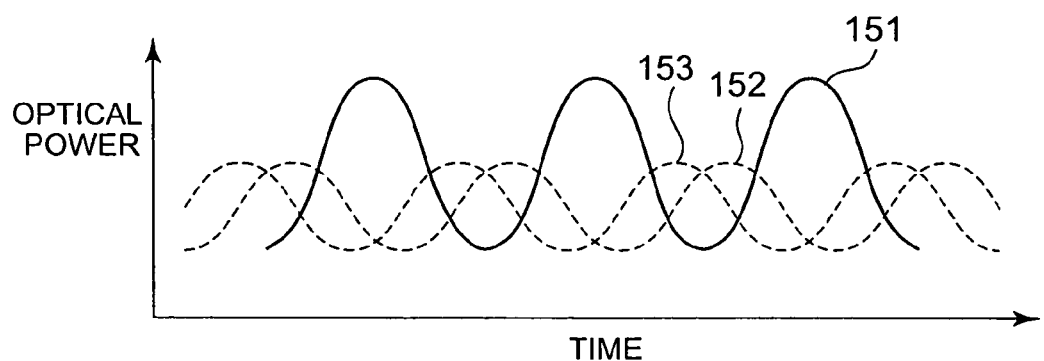
FIG. 5B is a signal waveform diagram showing waveforms of a fundamental mode optical signal and high-order mode optical signals individually.
Figure 5C:
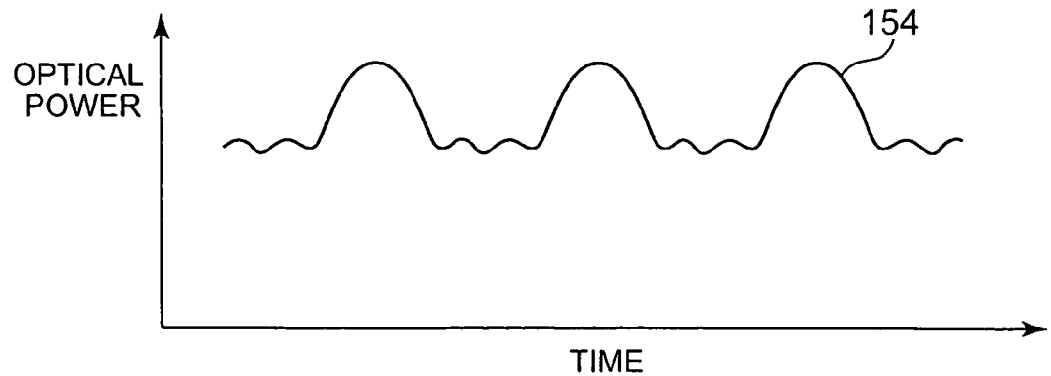
FIG. 5C is a signal waveform diagram showing influences of high-order mode optical signals on a fundamental mode optical signal.

First, an influence of a higher-mode optical signal on a fundamental mode optical signal will be explained using FIG. 5A to FIG. 5C. In FIG. 5A to FIG. 5C, the horizontal axis represents the time and the vertical axis represents optical power. FIG. 5A shows an ideal signal waveform in which only a fundamental mode optical signal 151 as a principal signal is transmitted through a waveguide. In contrast, FIG. 5B shows a case where high-order mode optical signals 152 and 153 are transmitted together with the fundamental mode optical signal 151 and shows signal waveforms of their respective optical signals. The high-order mode optical signals 152 and 153 are noise components. These signals have a transmission velocity different from the transmission velocity of the basic mode optical signal 151. One of the causes is that part of the high-order mode optical signal seeps from the core into cladding and propagates. Here, the refractive index of the cladding is lower than the refractive index of the core. For this reason, the high-order mode optical signal seeped into the cladding and propagating has a higher propagation velocity than the basic mode optical signal propagating through the core. Another cause is that the high-order mode optical signal propagating through the core has a lower transmission velocity (=group velocity) in the propagation axis direction in the core than the fundamental mode optical signal, causing a so-called mode dispersion. Because these factors influence in a complicated manner, the high-order mode optical signals 152, 153 produce different phase relationships on the fundamental mode optical signal 151.

FIG. 5C shows an example of a signal waveform combining the fundamental mode optical signal 151 and high-order mode optical signals 152, 153. This combined waveform 154 is affected by the high-order mode optical signals 152, 153. The combined waveform 154 includes waveform distortion with the fundamental mode optical signal 151 provided with ripples. Furthermore, the combined waveform 154 does not have any constant shape due to phase variations of the high-order mode optical signals 152, 153. Therefore, when chromatic dispersion is compensated in a communication system in which an optical signal is transmitted in single mode, it is necessary to remove influences of high-order mode optical signals first and then carry out resonation, otherwise it is not possible to carryout dispersion compensation successfully.

Then, the basic structure of a tunable dispersion compensator according to a first embodiment of the present invention to solve the above described problems will be explained.

Figure 6:
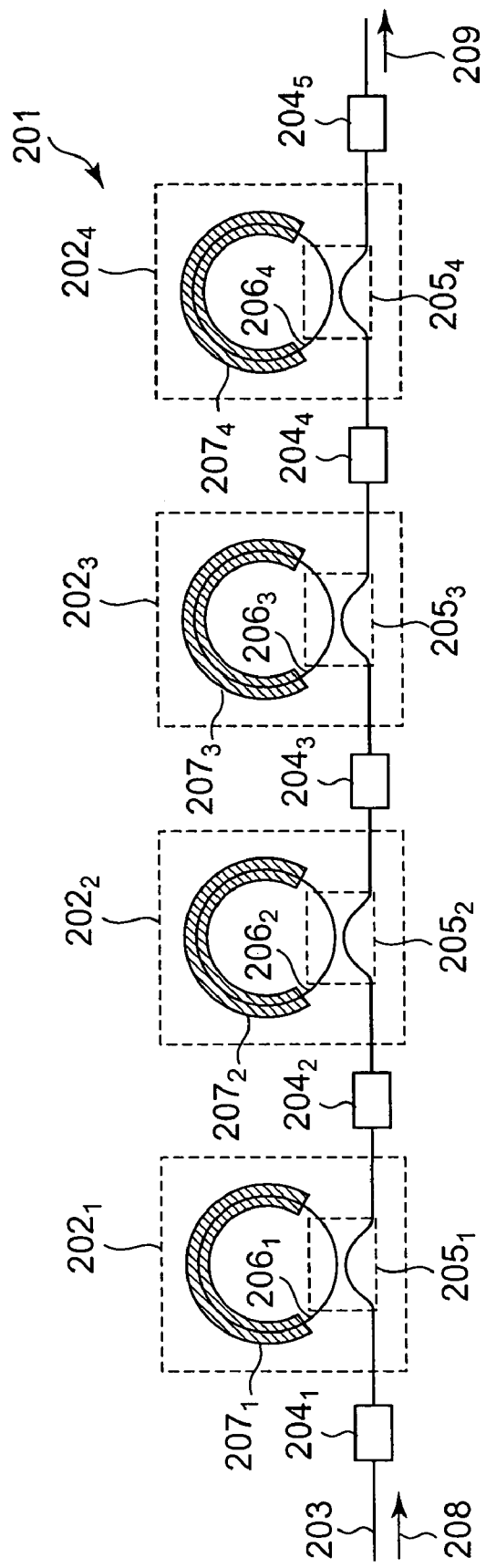
FIG. 6 is a plan view showing a structure of a tunable dispersion compensator of the present invention.

FIG. 6 shows a schematic structure of the tunable dispersion compensator according to the first embodiment of the present invention provided with four stages of ring resonators. This tunable dispersion compensator 201 connects a total of four stages of first to fourth ring resonators $202_1$ to $202_4$ in series along one common linear waveguide 203. The one linear waveguide 203 is provided with first to fifth mold filters $204_1$ to $204_5$ in such as way as to sandwich each of the ring resonators $202_1$ to $202_4$ from the input side and output side. These mold filters $204_1$ to $204_5$ are intended to remove noise components of higher modes which transmit through the linear waveguide 203.

The first ring resonator $202_1$ is provided with the linear waveguide 203 which transmits an optical signal 208 output from the first mode filter $204_1$, an optical coupler $205_1$ which distributes its optical signal and a ring-shaped waveguide $206_1$ which delays the distributed optical signal. The first ring-shaped waveguide $206_1$ is provided with a heater $207_1$ for heating and controlling this. This heater $207_1$ is preferably disposed over almost the whole area of the first ring-shaped waveguide $206_1$ except the area making up the optical coupler $205_1$. This can make the temperature of the first ring-shaped waveguide $206_1$ more uniform. Furthermore, the optical coupler $205_1$ is made up of, for example, a directional coupler as shown in FIG. 6. After passing through the optical coupler $205_1$, the linear waveguide 203 is input to the second ring resonator $202_2$ through the second mode filter $204_2$. Here, the optical coupler 205 may also be made up of a multi mode interference (MMI).

The second to fourth ring resonators $202_2$ to $202_4$ may have the same structure as that of the first ring resonators $202_1$. They can also have the same structure so as to have the same design. Here, these ring resonators will be explained assuming that they have the same structure. The same components as those of the first ring resonator $202_1$ are assigned the same reference numerals. For the second ring resonator $202_2$, subscripts "1" added to these components are replaced by "2". Likewise, for the third or fourth ring resonator $202_3$, $202_4$, subscripts "1" added to these components are replaced by "3" or "4".

This embodiment will be explained exemplified by the case where an optical signal is transmitted through the linear waveguide 203 in the direction indicated by an arrow 208. The first to fourth mode filters $204_1$ to $204_4$ are disposed immediately before the first to fourth ring resonators $202_1$ to $202_4$, respectively. These prevent high-order optical signals from being input to the first to fourth ring resonators $202_1$ to $202_4$ as noise components. However, when the tunable compensator 201 is used for polarization diversity, the optical signal is transmitted bidirectionally through the linear waveguide 203. Therefore, a fifth mode filter $204_5$ is also disposed immediately after the fourth ring resonator $202_4$ as the mode filter. When not used for such an application, the arrangement of the fifth mode filter $204_5$ can be omitted.

Furthermore, an optical fiber is connected to the input side of the linear waveguide 203 and an optical signal 208 before dispersion compensation is input. In the same way, an optical fiber is connected to the output side of the linear waveguide 203 and an optical signal 209 after dispersion compensation is output.

Now, examples of design parameters will be described. The core diameter of the ring-shaped waveguide ranges from 0.1 to 10 µm, for example, approximately 5 µm. The length of the circumference of the ring-shaped waveguide ranges from 1 to 16 mm, for example, approximately 2 to 3 mm. The coupling efficiency of the directional coupler is several tens of percent, for example, approximately 50%. The FSR (free spectral range) of the resonator ranges from 12.5 to 200 GHz, for example, approximately 100 GHz. Furthermore, the temperature coefficient of the resonating central wavelength is approximately 0.01 nm/° C.

The substrates of these waveguides are made of silicon or glass (silica glass, etc.). Furthermore, these waveguides are formed by depositing silica glass on the substrates. The refractive index of the core is adjusted by Ge, etc., to be added to the silica glass. The heater is formed of a thin-film heater and evaporated or fixed onto the ring-shaped waveguide. The thin-film heater is preferably made of metal and Cr, Pt, TiN, etc., is used.

Then, the basic structure of the first mode filter of the first embodiment of the present invention will be explained.

Figure 7:
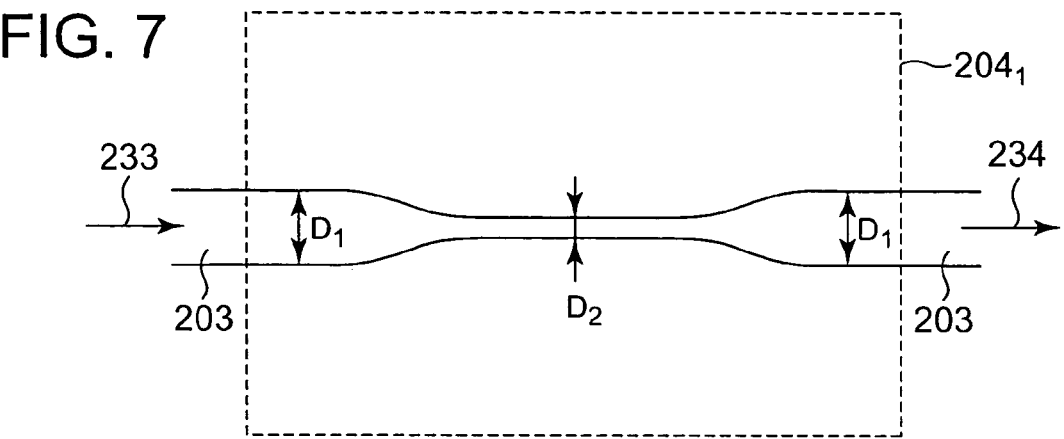
FIG. 7 is a plan view showing a specific structure of a mode filter according to a first embodiment.

FIG. 7 shows a structure of the first mode filter $204_1$ according to the first embodiment. In the first mode filter $204_1$, the width D1 of the linear waveguide 203 through which an optical signal is transmitted gradually narrows from the area close to the entrance toward the central area down to a width D2 at the center. Then, the width of the linear waveguide 203 gradually extends from this center toward the exit up to the width D1 again at the exit. Here, when the width D1 is 5 µm (micron), the width D2 is narrowed down to approximately 0.1 to 4 µm and preferably narrowed down to approximately 50% of D1. It is, for example, 2 µm. Thus, the first embodiment assigns the waveguide itself which inputs/outputs an optical signal to/from the resonator the role of the mode filter, and therefore there is no need to add additional components. Furthermore, both the mode filter and resonator are constructed of optical waveguides, and therefore the mode filter and resonator can be formed as one body. This makes it possible to reduce both the size and the cost of the tunable dispersion compensator.

Then, the operating principle of the first-mode filter according to the first embodiment will be explained.

In FIG. 7, an optical signal propagating in the direction indicated by a narrow 233 propagates through the first mode filter $204_1$. When the width of the linear waveguide 203 is narrowed from D1 down to D2, the high-order mode optical signal diverges out of this linear waveguide 203. This is because the high-order mode optical signal is less trapped in the core. Therefore, when the core diameter is small, the high-order mode optical signal cannot be contained in the core and diverges. In this way, only the fundamental mode optical signal 234 is output from the first mode filter $204_1$.

The second to fifth mode filters $204_2$ to $204_5$ may also be constructed in the same way as the first mode filter $204_1$. It can also have the same structure so as to have the same design. Thus, explanations of the operating principles thereof will be omitted.

Now, the operating principle of the tunable dispersion compensator of the first embodiment of the present invention will be explained.

Figure 1:
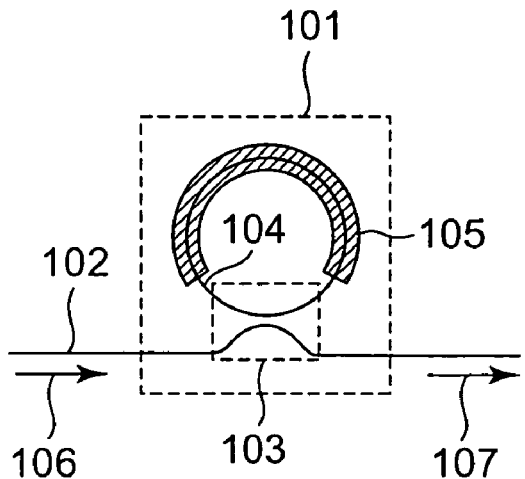
FIG. 1 is a plan view showing an example of a ring resonator as a conventionally proposed tunable dispersion compensation device.
Figure 2:
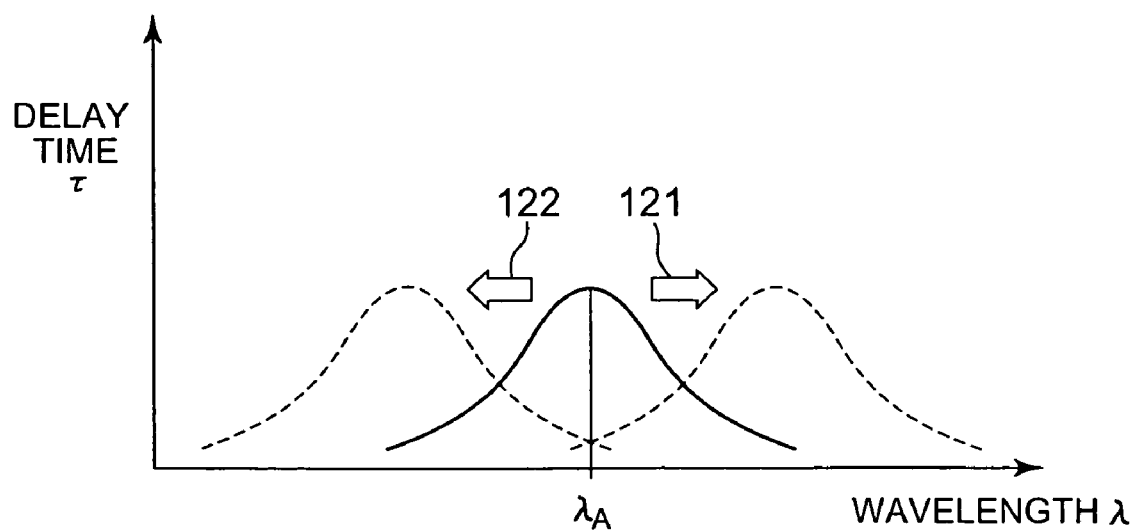
FIG. 2 illustrates a temperature characteristic variation of a resonating central wavelength of a conventional ring resonator.
Figure 3:
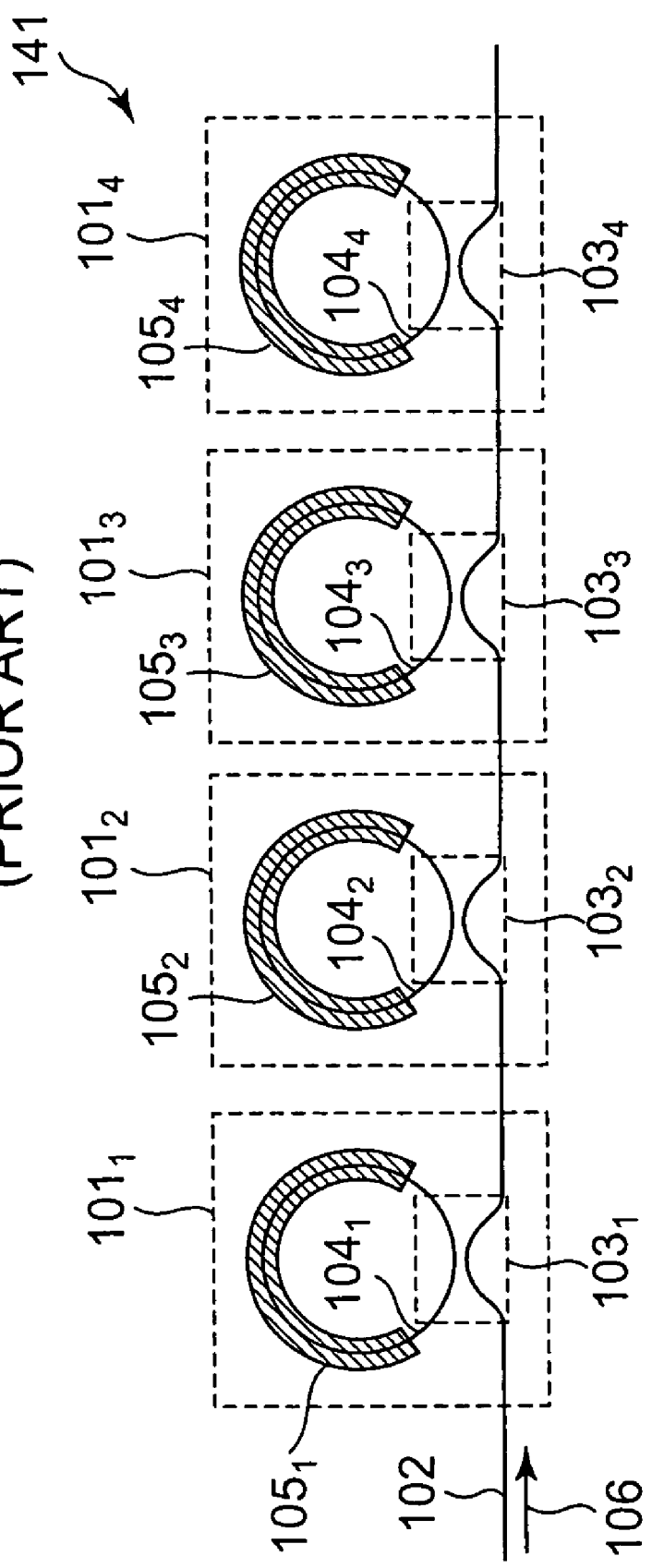
FIG. 3 is a plan view showing a tunable dispersion compensator with the ring resonators shown in FIG. 1 connected in multi-stages.
Figure 4:
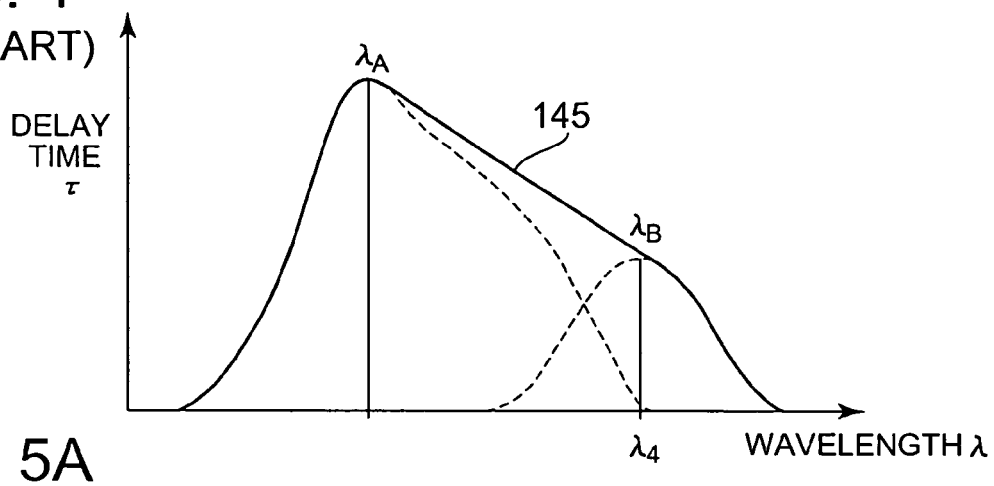
FIG. 4 is a characteristic diagram showing an example of combining waveforms into a conventionally proposed linear slope.

An optical signal 208 transmitted through the linear waveguide 203 is input to the first mode filter $204_1$. Here, the optical signal is deprived of the high-order mode component as described above and only the fundamental mode is output to the ring resonator $202_1$. Thus, only the ideal fundamental mode optical signal shown in FIG. 5A is input to the ring resonator $202_1$. Thus, ideal resonation occurs at the ring resonator $202_1$ and the signal waveform output becomes an ideal resonation waveform as shown in FIG. 2. Thus, the optical signal 209 output from this tunable dispersion compensator 201 has a signal waveform with less distortion. When the fifth mode filter $204_5$ is disposed on the output side, it is possible to remove the high-order mode from the optical signal input in the direction opposite to the optical signal 209, too, and use the tunable dispersion compensator also for polarization diversity.

Then, the basic structure of a tunable dispersion compensator according to a second embodiment of the present invention will be explained.

Figure 8:
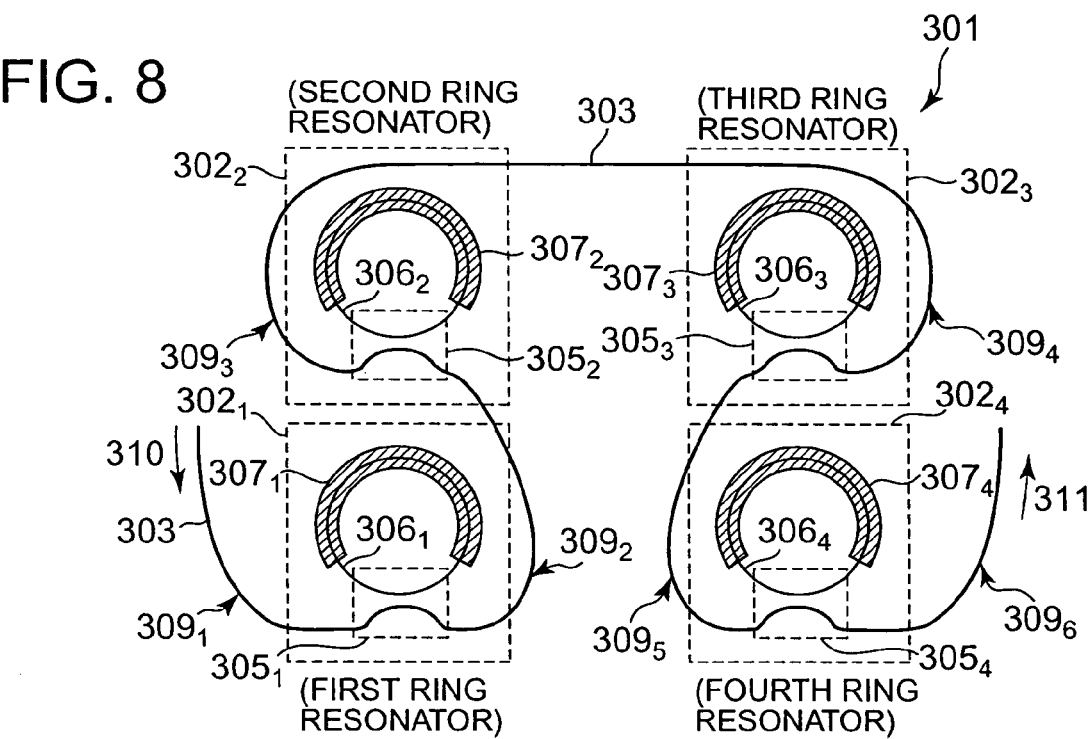
FIG. 8 is a plan view showing a specific structure of a mode filter according to a second embodiment.

FIG. 8 shows a schematic structure of the tunable dispersion compensator according to the second embodiment of the present invention. This tunable dispersion compensator 301 is constructed of first to fourth ring resonators $302_1$ to $302_4$ connected in series along a common linear waveguide 303. Here, a four-stage structure is shown as an example. The first ring resonator $302_1$ is constructed of a linear waveguide 303 which, transmits an optical signal, an optical coupler $305_1$ which distributes the optical signal and a ring-shaped waveguide $306_1$ which delays the distributed optical signal. The first ring-shaped waveguide $306_1$ is provided with a heater $307_1$ for heating and controlling. This heater $307_1$ is preferably disposed over almost the whole area of the first ring-shaped waveguide $306_1$ except the area making up the optical coupler $305_1$. This can make the temperature of the first ring-shaped waveguide $306_1$ more uniform. Furthermore, the first optical coupler $305_1$ is made up of, for example, a directional coupler as shown in FIG. 8. Here, the optical coupler 305 may also be made up of a multi mode interference (MMI).

The second to fourth ring resonators $302_2$ to $302_4$ may also have the same structure as that of the first ring resonator $302_1$. It can also have the same structure so as to have the same design. Here, these ring resonators will be explained assuming that they have the same structure. The same components as those of the first ring resonator $302_1$ are assigned the same reference numerals or the second ring resonator $302_2$, subscripts "1" added to these components are replaced by "2". Likewise, for the third or fourth ring resonators $302_3$, $302_4$, subscripts "1" added to these components are replaced by "3" or "4".

A portion of the linear waveguide 303 immediately before the first ring resonator $302_1$ constitutes a curved waveguide, forming a first mode filter $309_1$. Likewise, a portion of the linear waveguide 303 connecting the first and second ring resonators $302_1$, $302_2$ constitutes a curved waveguide, forming a second mode filter $309_2$. Furthermore, a portion of the linear waveguide 303 connecting the second and third ring resonators $302_2$, $302_3$ constitutes a curved waveguide, forming third and fourth mode filters $309_3$, $309_4$. Here, to be bilaterally symmetrical, two mode filters are disposed between the second and third ring resonators, but only one mode filter may be used. Furthermore, a portion of the linear waveguide 303 connecting the third and fourth ring resonators $302_3$, $302_4$ constitutes a curved waveguide, forming a fifth mode filter $309_5$. Furthermore, a portion of the linear waveguide 303 immediately after the fifth ring resonator $302_5$ constitutes a curved waveguide, forming a sixth mode filter $309_6$. This sixth mode filter $309_6$ is for polarization diversity and other applications may be omitted. In this way, the second embodiment also assigns the waveguides which input/output an optical signal to/from the resonators the role of mode filters, thus eliminating the need to add additional components. Furthermore, both the mode filter and resonator are constructed of optical waveguides, and therefore the mode filter and resonator can be formed as one body. Furthermore, since the mode filters are constructed of curved waveguides, the mode filters can be disposed in the portions where the respective resonators are connected. This makes it possible to reduce both the size and the cost of the tunable dispersion compensator.

Furthermore, an optical fiber is connected to the input side of the linear waveguide 303 and an optical signal 310 before dispersion compensation is input. Likewise, an optical fiber is connected to the output side of the linear waveguide 303 and an optical signal 311 after dispersion compensation is output.

Examples of design parameters are equivalent to the tunable dispersion compensator of the above described first embodiment. Furthermore, the various materials, too, are equivalent to those of the tunable dispersion compensator of the first embodiment.

Then, the operating principle of the tunable dispersion compensator according to the second embodiment of the present invention will be explained.

Figure 9:
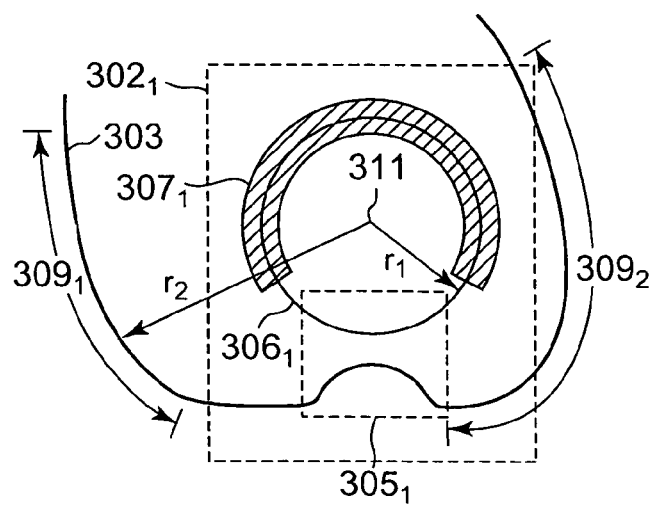
FIG. 9 is a plan view specifically showing peripheries of the first ring resonator of the second embodiment.

FIG. 9 shows details of the peripheries of the first ring resonator. The linear waveguide 303 immediately before the first ring resonator $302_1$ constitutes the above described curved waveguide, forming the first mode filter $309_1$. Adopting such a curved shape for the portion of the linear waveguide removes the high-order mode optical signal and allows only the fundamental mode optical signal to be transmitted. Thus, the optical signal which has passed through the first mode filter $309_1$ only consists of the fundamental mode component and is input to the first ring resonator $302_1$. This is because the high-order mode optical signal is less trapped in the core. Therefore, the high-order mode optical signal cannot be contained in the core in the curved shape of the first mode filter $309_1$ and diverges out of the core. Note that part of the high-order mode optical signal is mode-converted and returned to the fundamental mode.

Here, the distance from the central point 311 to the first ring-shaped waveguide $306_1$ is a first radius r1. Furthermore, the distance from the central point 311 to the first mode filter $309_1$ is a second radius r2. When the relationship between this first radius r1 and second radius r2 falls within the range indicated by the following Expression (1), this curved waveguide removes the high-order mode optical component. Then, this curved waveguide functions as a mode filter.

$$r1 < r2 < 3 \times r1 \qquad (1)$$

In the range shown in the following Expression (2), the high-order mode is removed better.

$$r1 < r2 < 1.5 \times r1 \qquad (2)$$

Furthermore, as shown in FIG. 8, if the first to sixth mode filters $309_1$ to $309_6$ have lengths of approximately ¼ of the circumference of the circle of a radius r2 which is the radius of curvature of the mode filter, it is possible to remove high-order mode optical signals sufficiently. Note that since the high-order mode can be removed more easily by reducing the radius of curvature r2 of the mode filter, it is also possible to further shorten the length of the mode filter.

As the second radius r2 approximates to the first radius r1, the efficiency of removing high-order mode optical signals increases. Thus, suppose the case where the mode filter 309 is disposed in the vicinity of the ring-shaped waveguide 306 with a reduced space. When the first and second radiuses r1 and r2 match, the two waveguides overlap with each other, which makes the arrangement impossible. Thus, the second radius r2 needs to be at least 1.2 times the first radius r1.

Thus, the relationship between the first and second radiuses r1 and r2 is expressed by the following Expression (3) more preferably than Expression (2):

$$1.2 \times r1 \leq r2 < 1.5 \times r1 \qquad (3)$$

The first mode filter $309_1$ has been explained so far, but the second mode filter $309_2$ also has the same structure. The second mode filter $309_2$ singles out a fundamental mode optical signal as the only optical signal input to the second ring resonator $302_2$. Thus, the problem caused by the mixture of a high-order mode signal component can be avoided. The other third to fifth mode filters $309_3$ to $309_5$ also have the same structure. Furthermore, the sixth mode filter $309_6$ used as polarization diversity also has the same structure.

The tunable dispersion compensator 301 of this second embodiment uses the mode filter 309 as the curved waveguide. Thus, the width of the linear waveguide 303 itself need not be changed to remove the high-order modes. Therefore, while the mode filter of the first embodiment requires a photolithography technology on the submicron order to manufacture the narrow area, the waveguide can be manufactured with the same width in the case of the mode filter according to the second embodiment, which facilitates manufacturing. The high-order mode optical signal diverging out of the linear waveguide 303 diverges in various directions. Therefore, a high-order mode optical signal is less likely to reenter the linear waveguide 303. Even if the high-order mode optical signal reenters, it is removed because the mode filter 309 is disposed before each ring resonator 302. Therefore, it is possible to practically ignore influences of the reentering high-order mode optical signals. This is the same for the first embodiment, too. In the second embodiment, as shown in FIG. 8, it is possible to reduce the overall size of the tunable dispersion compensator 301 by efficiently coupling the first to fourth ring resonators $302_1$ to $302_4$ using the first to sixth mode filters $309_1$ to $309_6$. In FIG. 8, the directional couplers are used as the optical couplers, but multi-mode interference waveguides may also be used.

In this second embodiment, the high-order mode components are removed from an optical signal as described above and only the fundamental mode is input to the ring resonator $302_1$. Therefore, ideal resonation occurs at the ring resonator $302_1$ and the output signal waveform becomes an ideal resonating waveform as shown in FIG. 2. Thus, the optical signal 311 output from this tunable dispersion compensator 301 becomes a signal waveform with less distortion. When the sixth mode filter $309_6$ is disposed on the output side as shown in FIG. 8, the high-order modes can also be removed from an optical signal that enters from the direction opposite to the optical signal 311 and can be used as polarization diversity, too.

A modification example of the present invention will be explained below.

Figure 10:
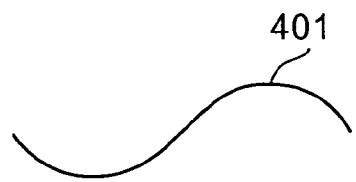
FIG. 10 is a plan view showing a specific structure of a mode filter according to a third embodiment.
Figure 11:
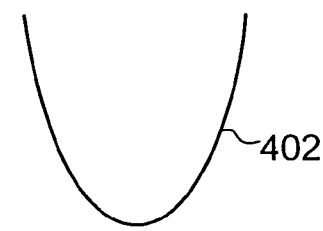
FIG. 11 is a plan view showing a specific structure of a mode filter according to a fourth embodiment.

In FIG. 8, the curved waveguides for removing high-order modes are formed of segments of a circle, but the curved waveguides may also be formed in different shapes. As an example, FIG. 10 shows an S-figured waveguide. Connecting several S-figured waveguides 401 into meandering waveguides can also be used as a mode filter of the present invention. As another example, FIG. 11 shows a parabolic waveguide. When the least radius of curvature of the parabolic waveguide 402 satisfies the aforementioned Expression (1), it is possible to remove high-order mode optical signals.

The foregoing embodiments have described ring resonators in a four-stage structure. However, the number of stages is not limited to this and a structure with 3 to 12 stages is generally appropriate. The number of stages can be selected according to the accuracy required for dispersion compensation and the band to be compensated, etc.

Figure 12:
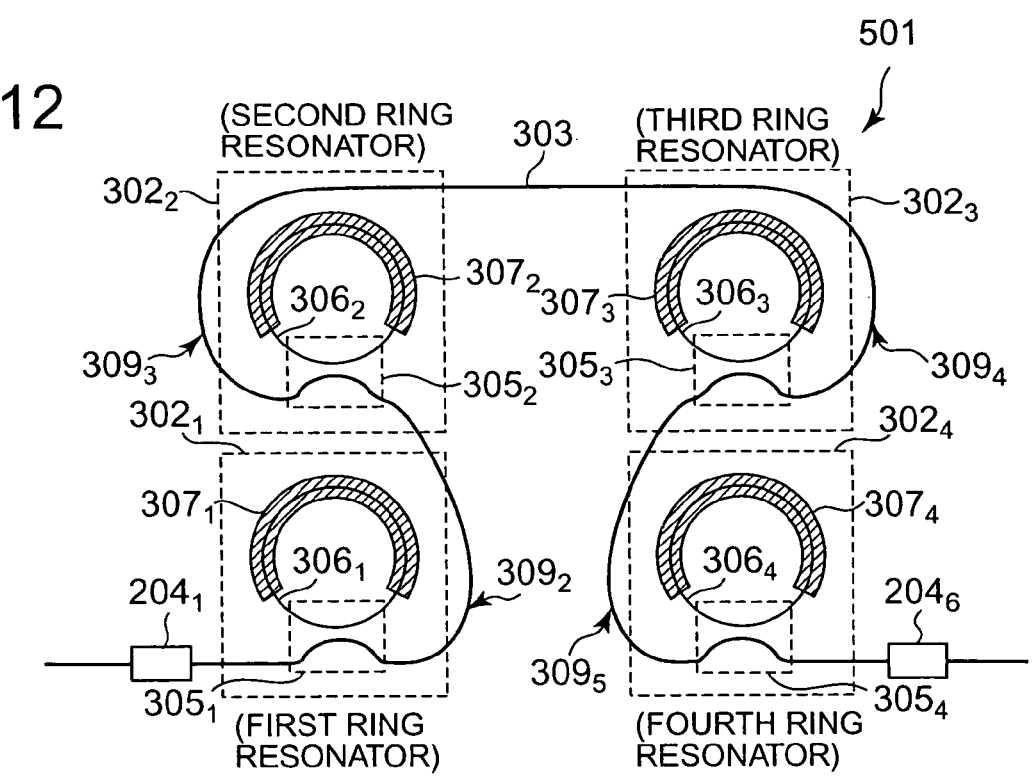
FIG. 12 is a plan view showing an example of a structure of a tunable dispersion compensator combining two types of mode fiber as a modification example of the present invention.

It is also possible to combine the mode filter in the first embodiment with the mode filter in the second embodiment. FIG. 12 shows an example of a tunable dispersion compensator combining different mode filters. In FIG. 12, the reference numerals shown in FIG. 8 are used as they are and reference numerals shown in FIG. 6 are used for some components. In a tunable dispersion compensator 501 in the modification example, a first mode filter $204_1$ is disposed on the input side of a first ring resonator $302_1$ and a sixth mode filter $204_6$ is disposed on the output side of the fourth ring resonator $302_4$. These are constructed of the mode filters according to the first embodiment shown in FIG. 7. Then, second to fifth mode filters $309_2$ to $309_5$ are disposed on a linear waveguide 303 connecting from the first ring resonator $302_1$ to the fourth ring resonator $302_4$. These are constructed of the mode filters according to the second embodiment shown in FIG. 9. Their operations are the same as those of the first embodiment and second embodiment.

Here, in the second embodiment shown in FIG. 8, the input/output linear waveguide is affected by the shapes of the curved waveguides of the first and sixth mode filters $309_1$, $309_6$ and drawn out upward in the figure. On the contrary, the modification example has the effect that the input/output linear waveguide is not affected by the shapes of the curved waveguides. FIG. 12 shows an example where the input/output linear waveguide is drawn out rightward and leftward in the figure. In these modification examples, the mode filters and resonators are constructed of optical waveguides, and therefore the mode filters and resonators can be formed as one body.

As shown above, the present invention has the following effects:

The present invention removes high-order mode components of an optical signal through mode filters and inputs only the fundamental mode optical signal to the resonator. This eliminates ripples from the signal waveform output from the resonator. Therefore, the signal waveform formed by combining these signal waveforms can also have a characteristic with less distortion and can compensate for optical dispersion satisfactorily. Furthermore, the waveguide for inputting/outputting an optical signal to/from the resonator itself is assigned the role of a mode filter, and therefore there is no need to add separate components. Thus, it is possible to reduce the cost and the size of the tunable dispersion compensator.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents a scan be included within the spirit and scope of the following claims.

What is claimed is:

1. A tunable dispersion compensator comprising:
   a mode filter which inputs an optical signal, removes high-order modes of said optical signal and outputs only a fundamental mode;
   a resonator which inputs the optical signal output from said mode filter and outputs said optical signal with a delay time added; and
   tunable controlling means for controlling said resonator in a tunable manner;
   wherein said mode filter and said resonator are constructed of optical waveguides on substrates and said tunable controlling means is disposed in the vicinity of said waveguides;
   wherein said resonator is a ring resonator comprising:
   a linear waveguide;
   a ring-shaped waveguide arranged along said linear waveguide; and
   an optical coupler which optically couples said linear waveguide and said ring-shaped waveguide, and
   said mode filter is disposed on said linear waveguide on at least one of the input side and output side of said ring resonator; and
   wherein said mode filter includes a curved area where high-order modes are emitted and only the fundamental mode is transmitted and said curved area is disposed along the perimeter of said ring-shaped waveguide.

2. The tunable dispersion compensator according to claim 1, wherein the radius of curvature of said curved area is greater than the radius of curvature of said ring-shaped waveguide and smaller than three times thereof.

3. The tunable dispersion compensator according to claim 2, wherein the radius of curvature of said curved area is greater than 1.2 times the radius of curvature of said ring-shaped waveguide and smaller than 1.5 times thereof.

4. The tunable dispersion compensator according to claim 1, wherein the length of said curved area is longer than approximately ¼ of the circumference of a circle having the same radius as the radius of curvature of said curved area.

5. The tunable dispersion compensator according to claim 1, wherein said ring resonators are disposed adjacent to one another in a matrix form,
   said linear waveguide is disposed so as to weave along the perimeter of said ring-shaped waveguide of said ring resonator, and
   said curved area is disposed along the perimeter of said ring-shaped waveguide.

6. The tunable dispersion compensator according to claim 1, wherein said linear waveguide is curved,
   said ring resonator is disposed in the curved area of said linear waveguide, and
   then said curved area is disposed along the perimeter of said ring-shaped waveguide of said ring resonator.

7. The tunable dispersion compensator according to claim 1, wherein said optical coupler is a directional coupler.

8. The tunable dispersion compensator according to claim 1, wherein said optical coupler is a multi-mode interference (MMI).

9. The tunable dispersion compensator according to claim 1, wherein said linear waveguide, said ring-shaped waveguides and said optical couplers provided for said ring resonator are formed of silica glass optical waveguides.

10. The tunable dispersion compensator according to claim 1, wherein said tunable controlling means is central wavelength controlling means of said resonator.

11. The tunable dispersion compensator according to claim 10, wherein said central wavelength controlling means is temperature controlling means.

12. The tunable dispersion compensator according to claim 11, wherein said temperature controlling means is a heater.

13. The tunable dispersion compensator according to claim 1, wherein said mode filters are disposed before and after said resonator and used with said optical signals input from both directions.

14. The tunable dispersion compensator according to claim 1, further comprising an input optical fiber and an output optical fiber.

* * * * *